United States Patent
Reichman (10) Patent No.: US 8,175,026 B2
(45) Date of Patent: May 8, 2012

(54) RESOURCE MANAGEMENT IN MESH SATELLITE COMMUNICATION SYSTEMS

(75) Inventor: Arie Reichman, Kfar Saba (IL)

(73) Assignee: Ruppin Academic Center, Emek Hefer (IL)

( * ) Notice: Subject to any disclaimer, the term of this patent is extended or adjusted under 35 U.S.C. 154(b) by 373 days.

(21) Appl. No.: 12/607,220

(22) Filed: Oct. 28, 2009

(65) Prior Publication Data

US 2010/0103866 A1 Apr. 29, 2010

Related U.S. Application Data (60) Provisional application No. 61/108,879, filed on Oct. 28, 2008.

(51) Int. Cl.
*H04W 72/00* (2009.01)
*H04W 72/04* (2009.01)
*H04B 7/185* (2006.01)

(52) U.S. Cl. ............ 370/316; 370/236.1; 370/312; 370/329; 455/436; 455/13.1

(58) Field of Classification Search .......... 370/230–237, 370/252–256, 312–350, 390, 452, 492; 455/3.01–3.06, 13.1, 436, 277.1, 381, 562.1; 398/58, 68, 135; 714/E11.032, E11.131, 714/748, 807; 708/191
See application file for complete search history.

(56) References Cited

U.S. PATENT DOCUMENTS

| | | | | |
|---|---|---|---|---|
| 5,532,856 A | * | 7/1996 | Li et al. | 398/58 |
| 5,926,469 A | * | 7/1999 | Norstedt et al. | 370/329 |
| 6,480,502 B1 | * | 11/2002 | Abadi et al. | 370/432 |
| 6,654,357 B1 | * | 11/2003 | Wiedeman | 370/315 |
| 2003/0153338 A1 | * | 8/2003 | Herz et al. | 455/517 |
| 2004/0203829 A1 | * | 10/2004 | Miyoshi et al. | 455/452.1 |
| 2005/0002375 A1 | * | 1/2005 | Gokhale et al. | 370/347 |
| 2005/0164664 A1 | * | 7/2005 | DiFonzo et al. | 455/277.1 |

* cited by examiner

*Primary Examiner* — Afsar M. Qureshi (57) ABSTRACT

A method of allocating resources in a mesh-connected communication network comprising a plurality of terminals, and a limited quantity of communication resources for allocation between said terminals, comprises: a request phase in which a plurality of terminals calculate their requirements for resources and issue the same as requests; a distribution phase in which the requests are distributed to all other requesting terminals over the mesh; and a calculation phase in which each requesting terminal uses all available requests and calculates resource allocation over the mesh. Thus each requesting terminal determines the resource allocation.

22 Claims, 8 Drawing Sheets

RESOURCE MANAGEMENT IN MESH SATELLITE COMMUNICATION SYSTEMS

RELATIONSHIP TO EXISTING APPLICATIONS

The present application claims the benefit of priority of U.S. Provisional Patent Application No. 61/108,879, filed on Oct. 28, 2008, the contents of which are hereby incorporated by reference.

FIELD AND BACKGROUND OF THE INVENTION

The present invention relates to a device and method for resource management in mesh communication systems, more particularly but not exclusively to mesh connected systems which include a satellite element, and to terrestrial wireless communication systems.

Satellite Communication Systems

Almost all the existing satellite communication systems are based on the transponder principle of operation. Almost all the existing transponders are located on geostationary satellites. A transponder receives the signals transmitted from the ground (uplink) and filters those in the frequency band of operation, amplifies them and retransmits (downlink) in a frequency band different from the uplink band. The transmissions that pass the transponders are usually formatted according to international standards and limitations. The most popular standard today is DVB-S for transmission of digital television broadcasting. The new standard DVB-S2 is gradually taking the place of the DVB-S in new systems as well as in replacement of existing systems.

In the typical star type of system, a central station called the hub, controls the network. The DVB-S/S2 method is used for the outbound link or forward link (from the hub to the terminals) and the inbound link or return link (from the terminals to the hub) uses the DVB-RCS standard.

For example in the Amos 2 satellite there are 11 operating transponders in the Ku band, each having a bandwidth of 72 MHz. For example, one of them has an uplink frequency band of 13040.5±36 MHz and a downlink frequency band of 10740.5±36 MHz. The YES broadcasting company uses such a transponder with two DVB-S signals each one 36 MHz wide.

Resource Management

For the usage of a transponder or part thereof, the operator of the satellite communication system has to pay to satellite owner according to the bandwidth and the downlink power he is allowed to use. These resources are shared among the active transmissions. Therefore in order to save operating costs, the satellite communication system has to control the transmissions and to share the frequency band according to the requirements of the users.

For a star type of system that has a central hub that communicates with user terminals, control is carried out by the control center in the hub according to users needs. For other types of systems that are not of star type, like point to point systems, control is carried out by a dedicated communication and control system that operates in addition to point to point links.

Types of Communication Systems

According to the different types of links among the users in the network it is possible to define several systems:
a. Star where all users are connected by bidirectional or directional links to a hub
b. Point to point where two users are connected by bidirectional or directional link
c. Multiple point to point where pairs of users are connected by bidirectional or directional links
d. Mesh where users are connected by bidirectional or directional links
e. Fully Mesh where all users are connected to all other users by bidirectional links.

Connectivity

User A is connected to user B if a message can be transmitted from A to B directly or via other users' terminals. The minimal number of transmissions required for transmitting from A to B is the length of the connection. The smallest length is one (one hop). A fully connected system is a system where each user is connected to any other user with a connection of any length. The connectivity of the system is then to the largest length of connection among any two users. The connectivity is the diameter of graph theory. For example:

(a) A star system with bidirectional links has a connectivity of two.

(b) A fully mesh system has a connectivity one.

(c) N pairs $A_i B_i$ i=1, ..., N connected by bidirectional links can be transformed to a connected system if we add single links between $A_i B_{i+1}$ i=1, ..., N−1 and between $A_N$ and $B_1$. The connectivity of the resulting system is 2N−1.

(d) N pairs $A_i B_i$ i=1, ..., N connected by bidirectional links can be transformed to a connected system if we add single links between $A_i A_{i+1}$ i=1, ..., N−1 and between $A_N$ and $A_1$. The connectivity of the resulting system is N.

Synchronization Methods

There are several methods of synchronization. Some of the methods include:

synchronization based on GPS signals

Distribution from one terminal, 'clock master', to all the others, via special timing packets. The delays among stations may be known.

Distribution from several terminals. Each terminal has a time and an accuracy figure. The receiving terminal may adjust its timing and accuracy figure according to a combination of its existing timing and accuracy figure, and the received timing and accuracy figure.

Network Clock Reference

As an example, in a star system based on DVB-S/S2 for the outbound link and using DVB-RCS for the inbound link, time synchronization is a must. All system timing is maintained through a global clock distributed on the forward link. A timestamp of the 27 MHz Network Clock Reference (NCR) is recovered by each RCST so that an RCST has an absolute time reference, which would be in addition to a frequency reference. The return link framing structure is built on the NCR. This includes the start of bursts that are referenced to the NCR count and guard bands that are defined as offsets to the burst start in terms of NCR ticks. The entire return link structure is transmitted as a table on the forward link that defines the framing, coding, preambles and slots.

Another possible algorithm for synchronization is IEEE 1588 2008.

As mentioned, in the case of the star connection, resource allocation is based on a central hub, to which all terminals are directly linked. A problem arises however with the mesh type networks, where there is no central entity connected at a single hop to all terminals. How is resource allocation to be efficiently and dynamically managed?

SUMMARY OF THE INVENTION

According to one aspect of the present invention there is provided a mesh-connected communication network comprising a plurality of terminals connected together in a net, and a limited quantity of communication resources for allocation between the terminals, each terminal comprising a respective controller, the network providing operation in a plurality of resource allocation phases wherein the respective controllers are operated such that:

in a first, request, phase, a plurality of requesting terminals in the network are configured to calculate their requirements for resources;

in a second, distribution, phase, the requesting terminals distribute their requirements as respective requests such that all requests are distributed around the mesh; and in a third, calculation, phase, each requesting terminal independently calculates an allocation of resources based on all of the requests available to the respective requesting terminal, thereby allowing each requesting terminal to determine allocated resources on the network, and thus providing distributed resource allocation over the network.

In an embodiment, the mesh connected network comprises a satellite network.

In an embodiment, communication time delay variations between terminals are constant relative to durations of the time delays, thereby enabling synchronization over the network for the resource allocation based on a time delay to each terminal.

In an embodiment, one of the terminals is selected as a clock master, sending timing packets over the network to establish synchronization.

In an embodiment, each controller at respective requesting terminals is configured to send out time synchronization information for receipt by each other terminal, thereby to provide distributed synchronization.

In an embodiment, when available resources are less than requested resources, factors associated with at least one of users and services are used to determine an allocation of the available resources.

In an embodiment, each controller at respective requesting terminals is configured to calculate the allocation in at least two different ways and to use a satisfaction algorithm to select therebetween.

In an embodiment, the network is divided into clusters and a resource allocation is calculated for each cluster at requesting terminals of the cluster.

An embodiment may be configured to assign one terminal of each cluster as a cluster leader, and to calculate resource allocation between the clusters at each cluster leader.

An embodiment may carry a payload such as digital video broadcaster Internet.

An embodiment may have a connectivity being an integer greater than one, and wherein the connectivity defines a maximum hop length for the distribution cycle.

In an embodiment, the resources being allocated comprise at least one member of the group comprising bandwidth, frequency, transmission rate, and transmission time.

According to a second aspect of the present invention there is provided a method of allocating resources in a mesh-connected communication network comprising a plurality of terminals, and a limited quantity of communication resources for allocation between the terminals, the method comprising:

a request phase in which a plurality of terminals calculate their requirements for resources and issue the requirements as requests over the mesh;

a distribution phase in which the requests are distributed to all requesting terminals over the mesh;

a calculation phase in which each requesting terminal uses all available requests and calculates resource allocation over the mesh, thereby allowing each requesting terminal to determine an own allocation of resources.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the mesh-connected communication network.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments comprise a system and method for distribution of resources in a mesh-type network where the network lacks a central hub.

The present embodiments obviate the need for a central controlling hub in the case of a network that is not a star— type, and further obviates the need for a dedicated control communication link The method comprises at least some of completing the system to ensure connectivity, time synchronizing the system, including distribution of requests of users for resources, defining a criterion of resource allocation according to users priorities, need priorities, and existing connections, and may provide distributed control, including a controller in each terminal capable of controlling transmission and reception of requests, calculate resource allocation according to defined criteria, and controlling the mode of operation of the transmitter and receiver.

In conclusion, the present embodiments may provide distributed control in a connected system that does not requires a dedicated control communication link.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
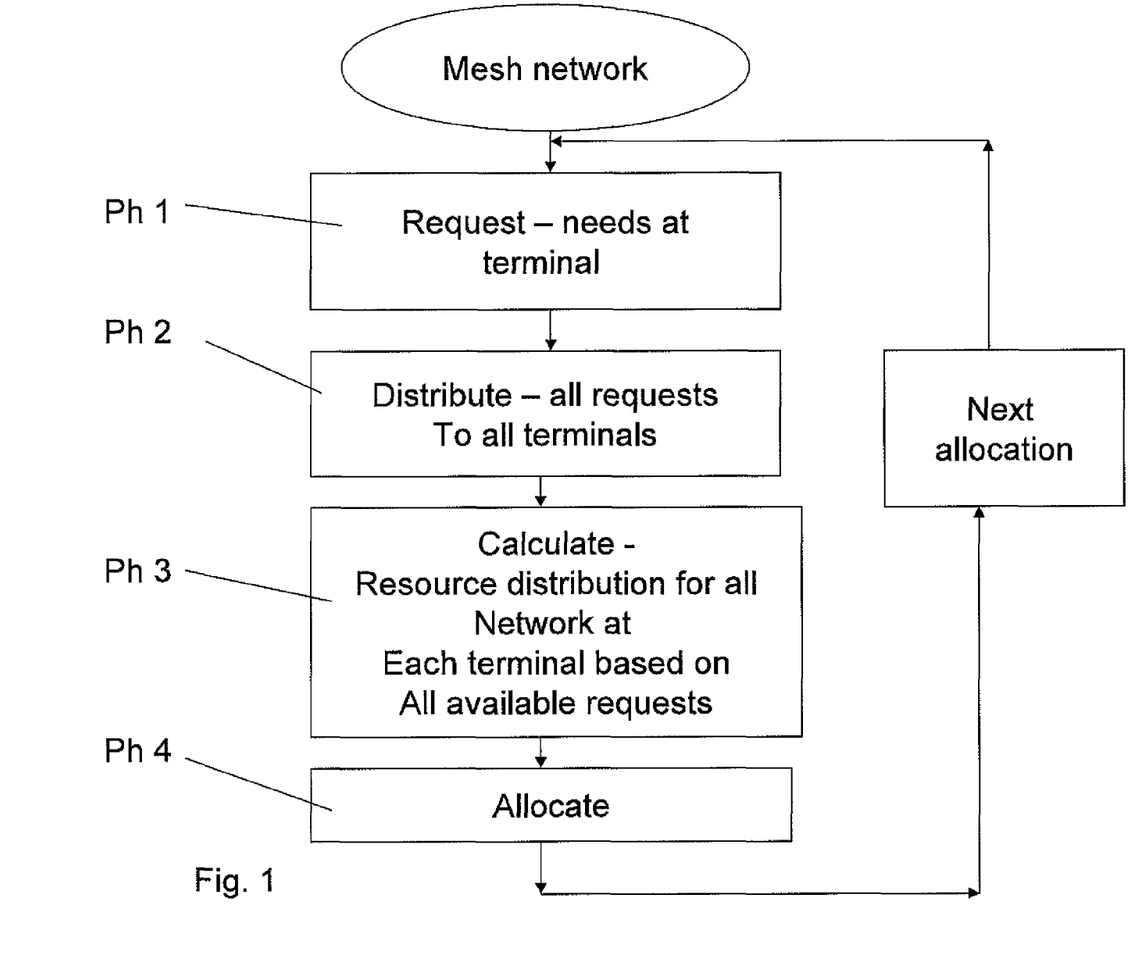
FIG. 1 is a simplified flow diagram illustrating a four phase process of resource allocation management according to a first embodiment of the present invention.

Reference is now made to FIG. 1 which is a simplified flow diagram that illustrates in conceptual manner a method of allocating resources in a mesh-connected communication network having multiple terminals connected in a network so that there is no central hub to which everyone in the network is connected. A limited quantity of communication resources is available for allocation between the terminals and the problem is to allocate the resources dynamically to the various communication links according to the current needs of the different terminals without any central control. The method of the present embodiments carries out a four phase process as illustrated.

The process begins with a request phase Ph1, in which multiple terminals calculate their requirements for resources and issue the requirements as a request, over the mesh. It is noted that in some cases all terminals may make requests, in other cases only a subset may make requests. In any event those terminals making requests for resources are referred to as requesting terminals. The request are for resources that are either lower of higher then those previous allocated. If no change is needed then no request is required by the particular terminal.

The request phase is followed by a distribution phase Ph2, in which the requests are distributed to all requesting terminals over the network. The network allows enough time to ensure that all terminals receive all requests.

The distribution phase Ph2 is followed by a calculation phase Ph 3 in which each requesting terminal uses all available requests and independently calculates resource allocation over the network.

Thus each terminal works out what resources it is entitled to and independently makes use of those resources.

The allocation then loops back to Ph1 in order to provide a new round of allocation. As a result, each requesting terminal determines its own allocation of resources.

The mesh connected network may include a satellite network.

The method may include synchronizing over the network so that each terminal can know when to make use of the newly calculated resources. One way of synchronizing involves measuring a time delay to each terminal. In general a satellite network has fairly stable connections. Once a terminal is set up, distances do not change, certainly not in relation to the total distances involved, so that time delays, of the order of magnitude of a quarter of a second, remain fixed.

An alternative synchronization method involves selecting a terminal as a clock master, and sending timing packets over the network to establish a synchronization.

If the network is relatively small then the above process is sufficient. For larger networks however, it is possible to divide the network into clusters and then calculate a resource allocation for each cluster at the various requesting terminals of the cluster.

Then, one terminal of the cluster may be assigned as a cluster leader. The cluster leaders in the network then calculate resource allocation between the clusters in the same way. However the cluster calculation is based on resources required for all the requesting terminals in the cluster, compared with the requests for the other clusters.

The method may be used to carry a digital video broadcast payload.

The mesh may have a connectivity being an integer greater than one. The connectivity is a property of the mesh that defines the minimum number of hops to get from one end of the network to the other. The connectivity in turn defines a maximum length for the distribution phase.

Sequence of Operations

The embodiments are now considered in greater detail. As shown in FIG. 1, the present method may require time synchronization and is carried out in a series of time dependent phases:

Request phase Ph1. In this phase the users that wish to change the resource allocation they have send a request to all other users.

Distribution among all terminals of all requests, Ph2. In this phase the users that have to relay messages may do so. The number of relays or retransmissions depends on the connectivity of the system. At the end of the distribution phase, all requests should have reached all terminals that are making the calculation.

Calculation of the new channel allocation Ph3. After each terminal receives all the requests each terminal then makes its own calculation of the new allocation plan.

Phase Ph4 involves change of allocation according to the new allocation plan.

Formula

The resource allocation is made taking into account:
users priorities;
need priorities; and
existing connections.

The present embodiments are not restricted to a specific formula, and any actual resource allocation will depend on the specific network and conditions, including types of traffic and even the weather. However the formula or the algorithm or the method used may be required to give a unique solution for allocation of resources including the order, the center frequency the parameters etc. Several examples follow.

Factors

In one example users may come in several types. If there are several types of users, each type may have a factor $u_i$, which is a positive number smaller then 1. For example for platinum users $u_1=0.9$, for gold users $u_2=0.8$, for regular users $u_3=0.7$. It is possible that a given user may temporarily select a lower priority that is allowed.

If there are several types of applications each application may have an application factor $v_i$, which is again a positive number smaller then 1. For example for platinum applications $v_1=0.9$, for gold applications $v_2=0.8$, for regular applications $v_3=0.7$.

In the first phase of the algorithm, each user may be allocated the requested rate or bandwidth. If the total allocated bandwidth is less than the total available then the allocation is completed and the order of the allocated users is according to the serial number of the user.

If the total allocation is larger than that possible within the limited resources, then the allocations are multiplied by user factor $u_i$, and/or by applications factor $v_i$. If the total allocated bandwidth is less than that available then the allocation is completed and the order of the allocated users is according to the serial number of the user.

If the total allocation is still larger than the total resources available, then the allocations are multiplied by user factor applications factor $v_i$. And so on.

It is noted that in various examples the factors may differ from iteration to iteration. Furthermore, if the request is not for rate but for quantity, the quantity can be transformed into rate by division by an estimated duration or maximal accepted delay. The parameters obtained using the factor method may not always be convenient to implement. In this case we choose the mode of operation that best fits the data rate obtained.

Factors Method with No Iterations

The reason for the above correction is that the present embodiments do not need iterations to get the solution.

If $\Sigma R_j^{(k)} < \Omega_{max}$ then $A_j^{(k)} = R_j^{(k)}$ (All the requests are granted). Else use the weighted sum of the requests to calculate:

$$A_j^{(k)} = \frac{v_k \cdot R_j^{(k)}}{\sum_i v_k \cdot R_i^{(k)}} \cdot \Omega_{max}$$

where $v_k$ are the "weights" (or priority factors). Those priority factors are chosen such that $v_k \geq 1$, where the lowest value $v=1$ corresponds to the least privileged client group, and the higher $v_k$ corresponds to higher priority client group.

Minimum Changes

If there are only a small number of requests for allocations then a method resulting in regular and frequent changes is not of interest, and simpler algorithms may be considered.
  a. For new requests bandwidth is available, the new allocations may be added without changing the existing allocation.
  b. A user who changes to a lower allocation without other requests may keep the existing allocation and remember the request for the next round
  c. A user who is asking for a higher allocation may try a new allocation with minimum changes in his existing allocations.

Algorithm for Bandwidth Allocation with Minimum Disconnections

In allocation of resources we assume the following:
Continuous range of frequencies, although in general, the frequency range could be fragmented.
The BW requests are quantized.
In the simpler case: The total of BW requests (old ones+new) is smaller then the BW range, and there is no overbooking. The ratio between the BW requests (old ones+new) and the BW range is a measure of the load.

Algorithm

The starting phase: We keep all the allocations with no change in the same position. The new requests allocations have to be fitted or squeezed into empty spaces. The number of the holes is a criterion for the hardness of the problem: the case with fewer and larger holes is easier.

Fitting phase: First trial to fit in the requests:
We may start from the greater new request and go down. Then, for each request, we search holes from the greater one to the least ones—which can best fit the request. We choose the allocation with the least residuum if it is smaller then the smallest unallocated request; if not we choose the largest residuum and move to next request.

We finish when all requests are allocated or when the empty spaces are smaller then the smallest unallocated request.

If those requests left not satisfied belong to the best fit set—then we are done.

Correction phase: If the fit-in process fails we may reduce the size of the new requests, for example by using the factors method described herein.

Alternative Correction phase: We may take only the fixed allocations and then add thereto the list of new requests. The fixed allocation to be removed is chosen if is bounded by two empty spaces. If several fixed allocation meet this criterion we may try all or we may choose the smaller new empty space formed after removing the chosen fixed allocation.

Final decision. Because it is an ad hoc algorithm, it is not clear that a correction phase indeed obtains better performance. Therefore for each phase in which we get an allocation, we have to calculate the satisfaction factor as discussed below and then choose the algorithm with the best satisfaction factor.

Multi Level Algorithms—Use of Clusters

As mentioned above, if the configuration is complex and connectivity is large, the delays of the algorithms increase. In this case we may consider a multiple level algorithm. Assume that we can divide the system into clusters such that each cluster has a smaller connectivity then the full system. Then we may find cluster leaders such that all the cluster leaders are connected between themselves with a lower connectivity then the full system. Then the resource algorithm may be run among the cluster leaders to allocate resources to each cluster and the algorithm may be run separately in each cluster the algorithm to allocate resources to terminals of the cluster.

Users Types

The users have different levels of service:
 a. Priority level. Higher priority users may receive a higher rate when there are not enough resources for everybody
 b. Assured level. The users receive a rate they require up to the assured level, and above this there is no guarantee.

Criteria for Optimal Operation
 a. A Satisfaction Criterion is Provided for Priority Level Users.

Lets assume $r_{a,i}$ is the rate that is allocated to user i and $r_{r,i}$ is the rate that is requested by user i.

The satisfaction factor of the user i, is given by:

$$\sigma_i = \frac{r_{a,i}}{r_{r,i}}$$

The average satisfaction of all users at any time can be obtained by a weighted average where the user i weight is $w_i$ according to the priority level.

$$\sigma = \frac{\sum_i w_i \sigma_i}{\sum_i w_i} \text{ for all active users}$$

b. Satisfaction Criterion for Assured Level Users

Lets assume $r_{0,i}$ is the rate that is assured to user i, $r_{a,i}$ is the rate that is allocated to user i and $r_{r,i}$ is the rate that is requested by user i. We choose a $\alpha<1$.

The satisfaction factor of the user i, is given by:

$$\sigma_i = \frac{r_{o,i} + \alpha(r_{a,i} - r_{o,i})}{r_{o,i} + \alpha(r_{r,i} - r_{o,i})} \text{ if } r_{r,i} > r_{a,i} > r_{o,i}$$

$$\sigma_i = \frac{r_{a,i}}{r_{o,i} + \alpha(r_{r,i} - r_{0,i})} \text{ if } r_{r,i} > r_{o,i} > r_{a,i}$$

$$\sigma_i = \frac{r_{a,i}}{r_{r,i}} \text{ if } r_{o,i} \geq r_{r,i}$$

The average satisfaction of all users at any time can be obtained by a weighted average where the user i weight is: $w_i = r_{o,i}$ $$\sigma = \frac{\sum_i w_i \sigma_i}{\sum_i w_i} \text{ for all active users}$$

Disconnections

The change of parameters of the transmissions such as center frequency or symbol rate causes a disconnection of duration of hundreds of milliseconds. The disconnection rate should be as low as possible. Changes of modulation or code do not cause disconnections.

The disconnections lower the satisfaction. For example we may change the satisfaction factor of the user i if a disconnection happens at the beginning of an interval by:

$$\sigma^1_i = \lambda_i \sigma_i \text{ where } \lambda_i < 1$$

A possible formula for $\lambda_i$ is:

$$\lambda_i = \frac{T_{period} - T_{disconnection}}{T_{period}} \gamma$$

where $T_{period}$ is the period between two occurrences of the algorithm, $T_{disconnection}$ is the disconnection time and $\gamma>1$ is a penalty factor due to the fact that the disconnection has additional bad effects besides the disconnection time los, such as delay or data loss/

Multiple Time References Synchronization Methods

The present embodiments teach a distributed system. The following discusses a distributed synchronization method. One possible reason is that for redundancy purposes there is more than one timing source. Another reason is that sources are not accurate enough and a synchronization process can improve the overall synchronization.

Each terminal may have a Time Stamp TS(i) at instant i and a Time Stamp Quality TQ(i). Any transmission includes the time stamp and the time stamp quality.

TS(i) and TQ(i) after the reception of TSr(i) and TQr(i) are updated if TQr(i)>TQ(i)–d. According to the common sense d should be d=0 but d is a parameter that has to be chosen by simulation.

The update TS(i+1)=αTS(i)+βTSr(i)
where α+β=1, α are β function of TQ(i) and TQr(i) respectively. The function may by proportionality.

The Time Stamp Quality update is $\gamma_{up}$ max {TQ(i),TQr(i)} where $\gamma_{up}>1$ in the case there was an update and $\gamma_{down}$ TQ(i) where $\gamma_{down}<1$ in the case where there was no update.

The above discussion is simplified, and in particular has been limited to the linear case.

Protocols

Format of Allocation Request

Allocation requests used messages according to a protocol that defines an agreed format. Typically at least the following fields are included:

Transmitting terminal
Transmitter (if several transmitters are at the terminal)
Time of the request
Data rate requested
Type of application
Priority. The priority can be up to the maximal
Layer of Operation The protocols of the present embodiments may be implemented on the MAC layer or IP (Internet Protocol) layer. For DVB-S2 standards both option are possible.

The MAC layer is based on MPEG2 packets which have a size of 188 bytes.

The messages may reach a destination using a specific PID (Packet ID).

If IP is used there are encapsulation algorithms like MPE (Multi-Protocol Encapsulation) and Ultra Light Encapsulation (ULE) that can be used for encapsulation of the protocol onto MPEG2 188 bytes packets. Generic Stream Encapsulation (GSE) is a more modern protocol that has been devised as an adaptation layer to provide network layer packet encapsulation and fragmentation functions over a Generic Stream of DVB-S2. GSE provides efficient encapsulation of IP datagrams over variable length Layer 2 packets, which are then directly scheduled on the physical layer into Base Band frames.

Controller

Each requesting terminal may be provided with a controller. The controller's task is to handle the protocol so as to calculate the allocation, also to control the allocation to the transmitters and receivers of each user terminal, and to remember the architecture of the system and the connectivity path from each user to each other user.

For each request received, the controllers selects between transmission through one of the transmitters or no transmission.

A prototype uses the Philips LPC 2138 as a controller.

Types of Transmissions

According to the message destination the transmission may be any of:
  a. Single cast sent to one user
  b. Multi cast sent to several users, and
  c. Broad cast sent to all users.

Specific Issues

The present embodiments have sensitivities that have to be investigated for a best solution. The embodiments require that each terminal makes the same calculation. Errors in messages would cause different terminals to get different list of requests and thus make different decisions. Loss of synchronization may have the same effect, and a defective terminal could produce either or both of loss of synchronization and errors in messages. In particular if the defective terminal is a relay, it may cause all terminals on one side of it to get a different version of a particular request as compared to all terminals on the other side of it.

In order to overcome the above, a message may be sent via two paths for redundancy. Further, if a receiver A does not receives a signal, it may transmit a message back to the terminal which was expected to transmit thereto in order to determine what has happened.

Furthermore, there are receivers that may be assigned a function (permanently or temporarily) to scan the frequency range to see if the proper transmitters transmit with the proper parameters.

Implementation with DVB-S2

The DVB-S2 is a standard used for satellite digital television broadcast. DVB-S2 is used for the outbound link or forward link, typically from the hub to the terminals in the standard star-type arrangement, and has the following features:
  1. Cheap receivers
  2. Medium cost transmitter
  3. A transmitter can transmit to several receivers at the same frequency.
  4. A receiver can not receive at the same time from several transmitters. Change of transmitter causes a momentary disconnection The following explains inter alia how DVB-S2 may be provided over a mesh network.

Multiple Point to Point System with Interconnection

Figure 2:
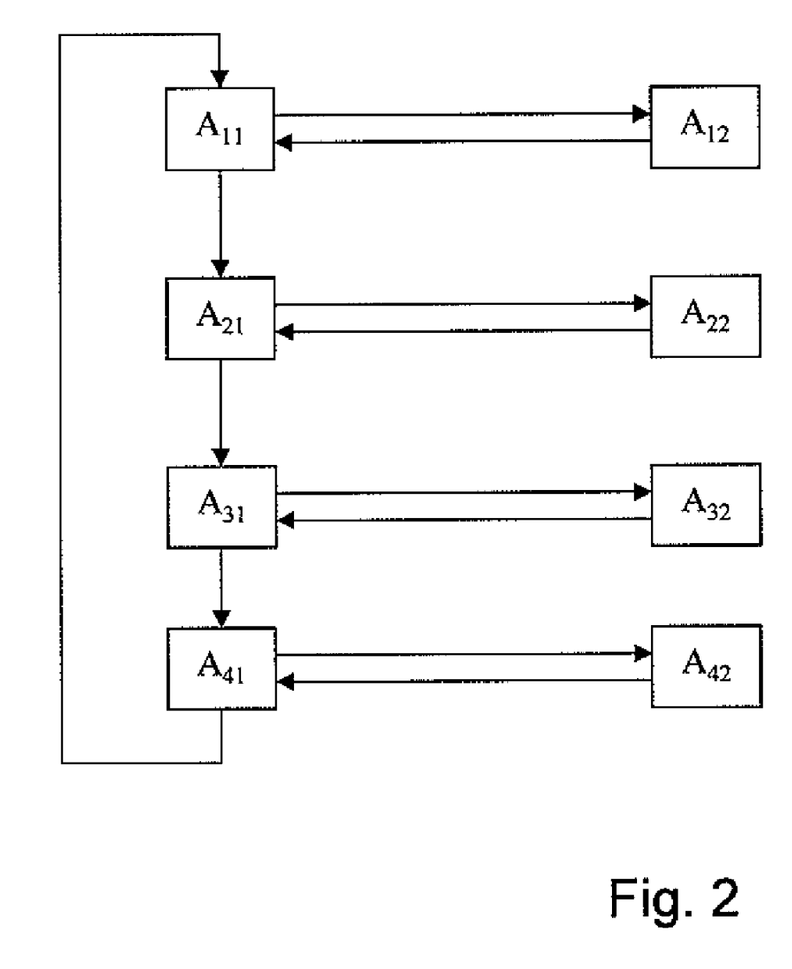
FIG. 2 shows an eight member mesh connected network according to an embodiment of the present invention.

An example of a system is shown in FIG. 2. Eight users $A_{11} \ldots A_{42}$ are connected in pairs with interconnection between pairs to ensure connectivity. The connectivity is 4 because there are 4 hops between $A_{11}$ and $A_{42}$. Each user has several transmitters and receivers and a controller. For example $A_{11}$ has one transmitter that transmits to $A_{21}$ and $A_{12}$ and one receiver that receives the signal from $A_{12}$. For example $A_{21}$ has one transmitter that transmits to $A_{22}$ and $A_{31}$ and one receiver that receives the signal from $A_{22}$ and another receiver that receives the signal from $A_{11}$.

The users $A_{x2}$ have one transmitter and one receiver while the users $A_{x1}$ have one transmitter and two receivers.

Figure 3:
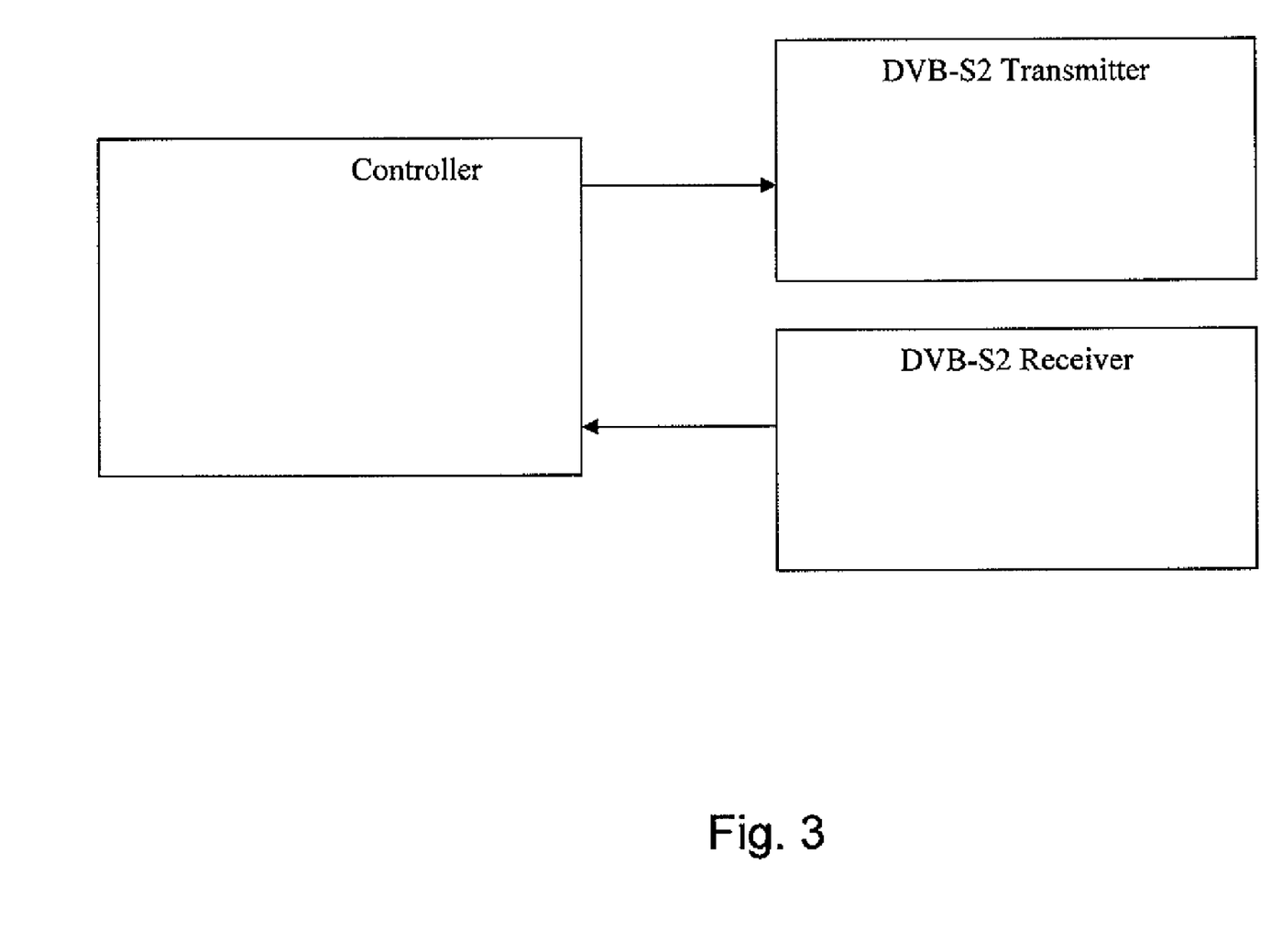
FIG. 3 illustrates connection architecture for some of the users in FIG. 2.

FIG. 3 illustrates the users $A_{x2}$ of the FIG. 2 architecture with one transmitter and one receiver.

Figure 4:
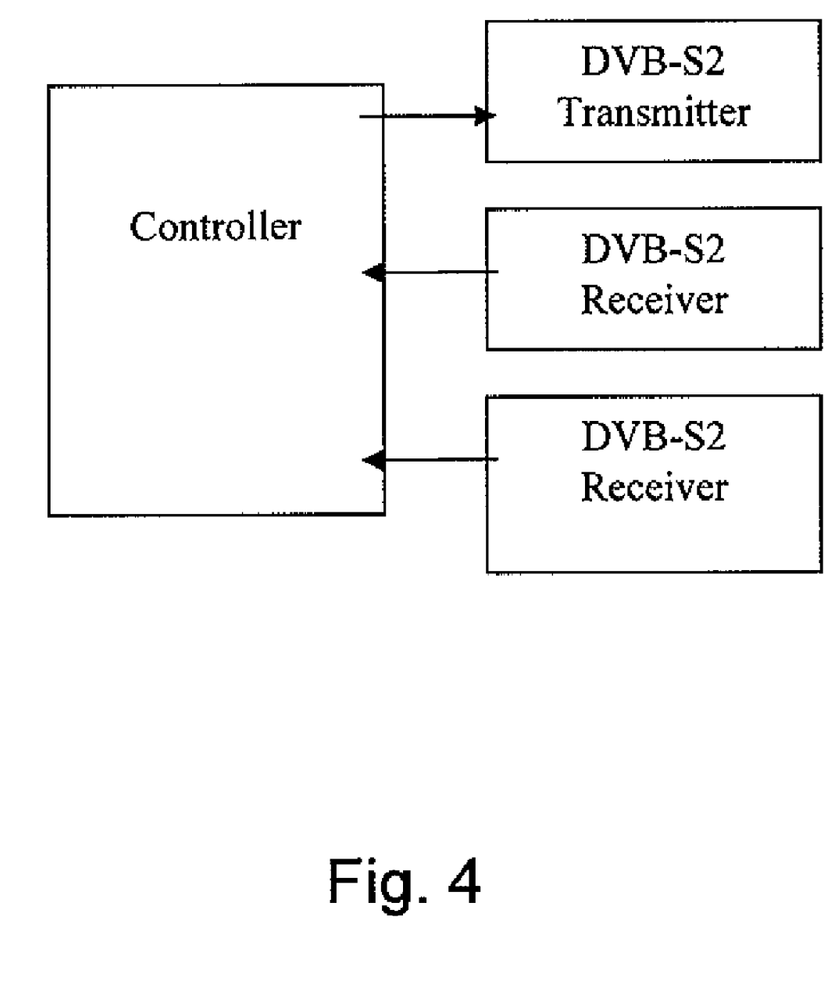
FIG. 4 illustrates connection architecture for other users of FIG. 2.

FIG. 4 illustrates users $A_{x1}$ of the FIG. 2 architecture with one transmitter and two receivers.

Figure 5:
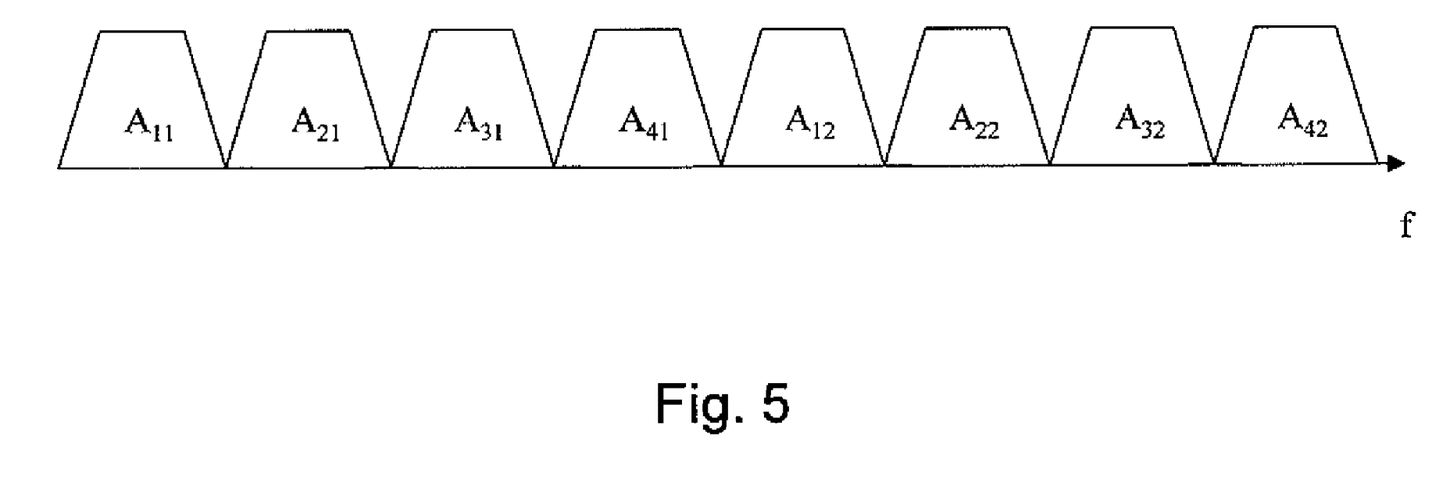
FIG. 5 is a simplified frequency diagram showing even allocation of frequencies as a resource between the users of FIG. 2.

In the frequency domain each transmitter has its own spectral band of occupation. FIG. 5 illustrates the case where all the transmissions have been allocated the same bandwidth. Any practical situation is likely to be more complex.

Multiple Star System with Interconnection

Figure 6:
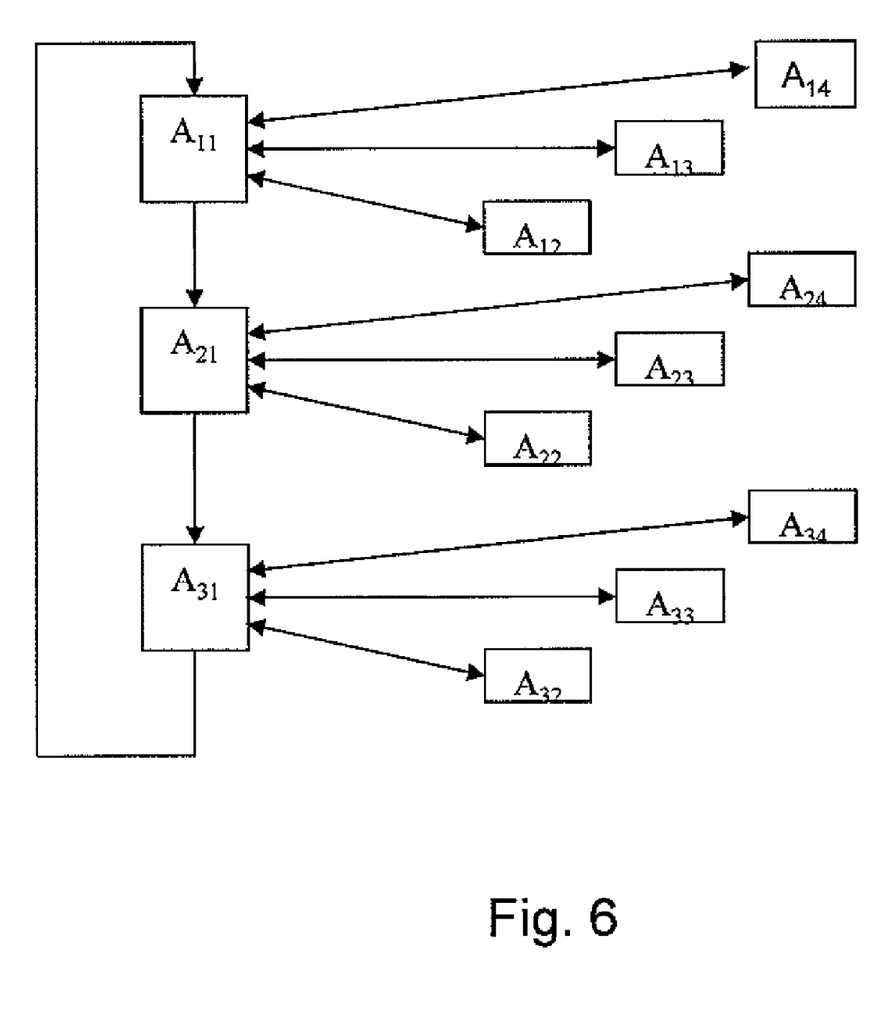
FIG. 6 is a simplified schematic diagram illustrating a twelve member mesh according to an embodiment of the present invention.

An example of a multi-star system with an interconnection is shown in FIG. 6. Twelve users $A_{13}$ to $A_{34}$ are connected in three stars with interconnection between pairs to ensure connectivity. The connectivity is 3 because there are 3 hops between $A_{11}$ and $A_{34}$. Each user has several transmitters and receivers and a controller. For example $A_{11}$ has one transmitter that transmits to $A_{21}, A_{12}, A_{13}$, and $A_{14}$ and four receivers that receives the signal from $A_{31}, A_{12}, A_{13}, A_{14}$. As another example, $A_{22}$ has one transmitter that transmits to $A_{21}$ and one receiver that receives the signal from $A_{21}$.

Figure 7:
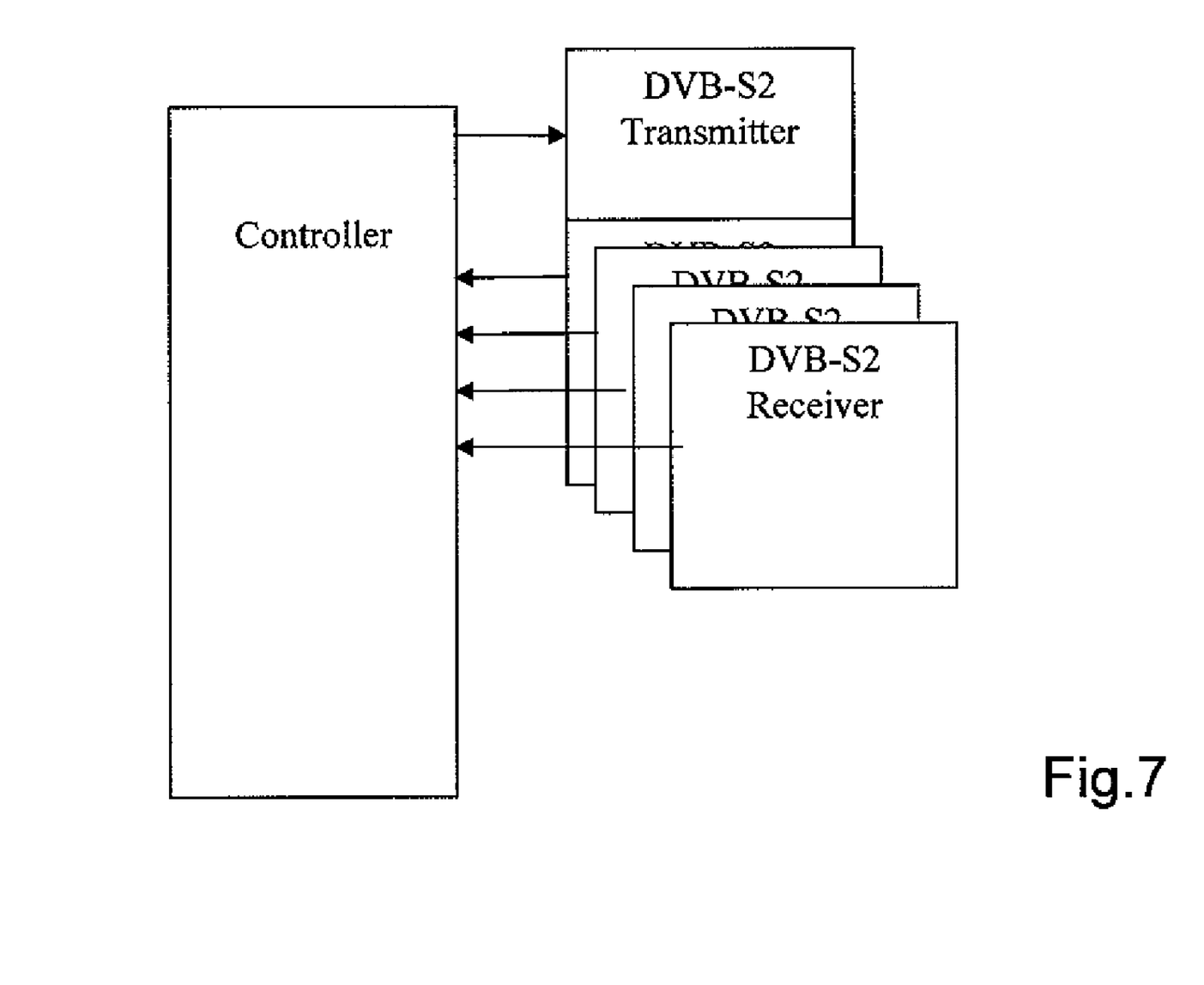
FIG. 7 is a simplified connection architecture for users of FIG. 6 according to an embodiment of the present invention.

FIG. 7 illustrates users $A_{x1}$ of the FIG. 6 architecture with one transmitter and four receivers.

Figure 8:
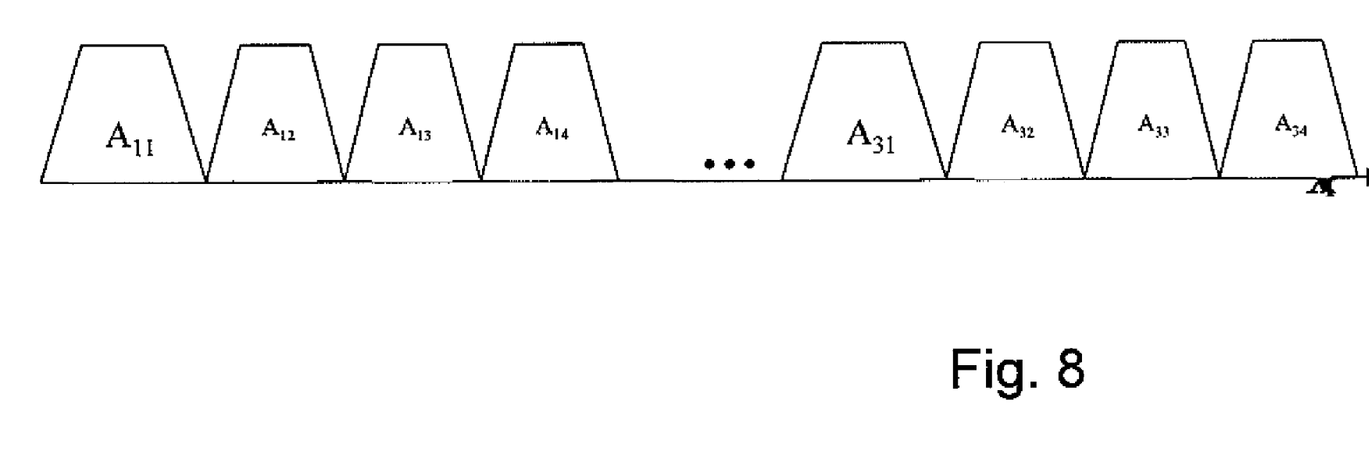
FIG. 8 is a simplified frequency diagram showing even allocation of a frequency resource according to an embodiment of the present invention.

In the frequency domain each transmitter has its own spectral region of occupation. FIG. 8 illustrates frequency allocation for the users of FIG. 6 but shows the special case where all users are allocated the same bandwidth. In general the situation may be more complex.

A two level allocation algorithm can be run. In such a case, the terminals from $A_{11}, A_{21}, A_{31}$ are the cluster leaders and each star is a cluster.

In providing a resource allocation in a mesh network according to the present embodiments, certain assumptions may be made:

It may be assumed that the system links are known except for faults that may be detected. The terminal may have an estimate of required resources such as data rate and corresponding bandwidth and parameters. Also the system may be fully connected.

The system may be time synchronized. Distribution may be requested via existing paths. Decision rules may be made for resource allocation. Distributed calculation and control capabilities are provided and recovery methods may be used in case of faults in terminals or delivery Furthermore, the method is not limited to DVB-S2. For non-DVB-S2 cases the restriction that one receiver cannot receive signals from several transmitters may not exist. For example if time division multiplexing is used, one receiver can share the time among transmitters. The present method is suitable for any mesh network and is not limited to satellite systems.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A mesh-connected communication network comprising a plurality of terminals connected together in a net, and a limited quantity of communication resources for allocation between said terminals, each terminal comprising a respective controller, the network providing operation in a plurality of resource allocation phases wherein said respective controllers are operated such that:
   in a first, request phase, a plurality of requesting terminals in said network are configured to calculate their requirements for resources;
   in a second, distribution phase, said requesting terminals distribute their requirements as respective requests such that all requests are distributed around said mesh; and
   in a third, calculation phase, each requesting terminal independently calculates an allocation of resources based on all of said requests available to said respective requesting terminal, thereby allowing each requesting terminal to determine allocated resources on said network, and thus providing distributed resource allocation over said network.

2. The mesh connected network of claim 1, wherein said mesh connected network comprises a satellite network.

3. The mesh connected network of claim 1, wherein communication time delay variations between terminals are constant relative to durations of the time delays, thereby enabling synchronization over said network for said resource allocation based on a time delay to each terminal.

4. The mesh connected network of claim 1, wherein one of said terminals is selected as a clock master, sending timing packets over said network to establish synchronization.

5. The mesh connected network of claim 1, wherein each controller at respective requesting terminals is configured to send out time synchronization information for receipt by each other terminal, thereby to provide distributed synchronization.

6. The mesh connected network of claim 1, wherein, when available resources are less than requested resources, factors associated with at least one of users and services are used to determine an allocation of the available resources.

7. The mesh network of claim 1, wherein each controller at respective requesting terminals is configured to calculate said allocation in at least two different ways and to use a satisfaction algorithm to select therebetween.

8. The mesh connected network of claim 1, wherein said network is divided into clusters and a resource allocation is calculated for each cluster at requesting terminals of said cluster.

9. The mesh connected network of claim 8, configured to assign one terminal of each cluster as a cluster leader, and to calculate resource allocation between said clusters at each cluster leader.

10. The mesh connected network of claim 1, carrying payload being a member of the group comprising digital video broadcast, and Internet.

11. The mesh connected network of claim 1, having a connectivity being an integer greater than one, and wherein said connectivity defines a maximum hop length for said distribution cycle.

12. The mesh-connected network of claim 1, wherein said resources being allocated comprise at least one member of the group comprising bandwidth, frequency, transmission rate, and transmission time.

13. A method of allocating resources in a mesh-connected communication network comprising a plurality of terminals, and a limited quantity of communication resources for allocation between said terminals, the method comprising:
   a request phase in which a plurality of terminals calculate their requirements for resources and issue said requirements as requests over said mesh;
   a distribution phase in which said requests are distributed to all requesting terminals over said mesh;
   a calculation phase in which each requesting terminal uses all available requests and calculates resource allocation over said mesh, thereby allowing each requesting terminal to determine an own allocation of resources.

14. The method of claim 13, wherein said mesh connected network comprises a satellite network.

15. The method of claim 13, comprising synchronizing over said network based on a time delay to each terminal.

16. The method of claim 13, wherein one of said terminals is selected as a clock master, sending timing packets over said network to establish synchronization.

17. The method of claim 13, wherein each terminal sends out time synchronization information for receipt by each other terminal, thereby to provide distributed synchronization.

18. The method of claim 13, further comprising defining a resource allocation criteria for allocation of available resources when said available resources are less than requested resources.

19. The method of claim 13, comprising dividing said network into clusters and calculating a resource allocation for each cluster at requesting terminals of said cluster.

20. The method of claim 19, comprising assigning one terminal of each cluster as a cluster leader, and calculating resource allocation between said clusters at each cluster leader.

21. The method of claim 13, comprising carrying a payload being at least one member of the group consisting of digital video broadcast and Internet.

22. The method of claim 13, having a connectivity being an integer greater than one, and wherein said connectivity defines a maximum hop length for said distribution phase.

* * * * *